United States Patent
Blewett et al.

(10) Patent No.: US 10,667,073 B1
(45) Date of Patent: May 26, 2020

(54) AUDIO NAVIGATION TO A POINT OF INTEREST

(71) Applicant: BOSE CORPORATION, Framingham, MA (US)

(72) Inventors: Mark Raymond Blewett, Worcester, MA (US); Paul Thomas Bender, Framingham, MA (US); Lee Zamir, Cambridge, MA (US); Santiago Carvajal, Ashland, MA (US); Todd Reily, North Reading, MA (US); Daniel Ross Tengelsen, Framingham, MA (US); Wade Torres, Attleboro, MA (US); Janet Liang Xu, Merced, CA (US); Stoyan I. Iliev, Framingham, MA (US); Alexander Gregory Coleman, Auburn, MA (US); Benjamin G. K. Peterson, West Boylston, MA (US)

(73) Assignee: BOSE CORPORATION, Framingham, MA (US)

(*) Notice: Subject to any disclaimer, the term of this patent is extended or adjusted under 35 U.S.C. 154(b) by 0 days.

(21) Appl. No.: 16/435,864

(22) Filed: Jun. 10, 2019

(51) Int. Cl.
| | |
|---|---|
| H04S 7/00 | (2006.01) |
| H04R 5/033 | (2006.01) |
| H04R 3/04 | (2006.01) |
| G06F 3/01 | (2006.01) |
| H04R 5/04 | (2006.01) |

(52) U.S. Cl.
CPC ............. *H04S 7/304* (2013.01); *G06F 3/013* (2013.01); *G06F 3/017* (2013.01); *H04R 3/04* (2013.01); *H04R 5/033* (2013.01); *H04R 5/04* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 7,167,567 B1* | 1/2007 | Sibbald | H04S 5/00 381/1 |
| 7,970,539 B2 | 6/2011 | Lee | |
| 10,390,170 B1* | 8/2019 | Karkkainen | G06N 3/08 |
| 2004/0030494 A1* | 2/2004 | Hull | H04L 67/12 701/441 |

(Continued)

OTHER PUBLICATIONS

Audio Engineering Society, Program: Keynotes and Panels from the 2019 AES International Conference on Immersive and Interactive Audio, Mar. 27-29, 2019, York, United Kingdom. http://www.aes.org/conferences/2019/immersive/program_keynotes_panels.cfm.

*Primary Examiner* — Qin Zhu
(74) *Attorney, Agent, or Firm* — Patterson + Sheridan, LLP (57) ABSTRACT

A method is provided for directing a user to a point of interest using sounds played on a wearable audio output device. A user's direction of gaze is determined using data from at least one sensor in the audio output device. First and second locations are determined of the user and the point of interest respectively, and a distance is determined between the first and second locations. A relative angle between the direction of gaze and the direction of the point of interest is determined based on the determined first and second locations. A sample sound is altered using at least one sonification technique to convey information relating to the determined distance and the relative angle. The altered sample sound is rendered and output for playing by the audio output device.

20 Claims, 5 Drawing Sheets

(56) References Cited

U.S. PATENT DOCUMENTS

| | | | | |
|---|---|---|---|---|
| 2008/0273722 A1 | 11/2008 | Aylward et al. | | |
| 2014/0107916 A1* | 4/2014 | Urup | .................... | G01C 21/20 |
| | | | | 701/425 |
| 2014/0114560 A1* | 4/2014 | Jensen | ............... | G01C 21/3629 |
| | | | | 701/409 |
| 2014/0147829 A1* | 5/2014 | Jerauld | .................. | G06F 1/163 |
| | | | | 434/430 |
| 2014/0219485 A1* | 8/2014 | Jensen | ................ | H04R 25/405 |
| | | | | 381/313 |
| 2015/0030159 A1* | 1/2015 | Ozcan | .................... | G06F 3/165 |
| | | | | 381/17 |
| 2015/0211858 A1* | 7/2015 | Jerauld | ................ | G02B 27/017 |
| | | | | 701/541 |
| 2015/0227778 A1* | 8/2015 | Cervantes | .......... | G02B 27/0172 |
| | | | | 348/47 |
| 2016/0080874 A1* | 3/2016 | Fullam | ................ | H04R 25/407 |
| | | | | 381/313 |
| 2016/0259027 A1* | 9/2016 | Said | ........................ | H04W 4/33 |
| 2017/0045941 A1* | 2/2017 | Tokubo | ................... | G06F 3/167 |
| 2018/0048750 A1* | 2/2018 | Hardi | ..................... | B60K 35/00 |
| 2019/0155404 A1* | 5/2019 | Cutrell | .................. | A63F 13/211 |
| 2019/0179604 A1* | 6/2019 | Alexander | ........... | H04R 1/1041 |
| 2019/0265802 A1* | 8/2019 | Parshionikar | ........... | G06F 3/012 |

\* cited by examiner

AUDIO NAVIGATION TO A POINT OF INTEREST

FIELD

Aspects of the disclosure generally relate to processing audio, and more specifically to methods and systems for navigating to a point of interest using audio cues.

BACKGROUND

Spatial audio effects (also known as 3D audio effects) are a group of sound effects that manipulate sound produced by stereo speakers, surround sound speakers, speaker arrays or headphones for virtual placement of sound sources anywhere in a three-dimensional space including behind, above or below a listener. Spatial audio processing generally includes transforming sound waves using head-related transfer function (HRTF) to mimic natural sounds which emanate from a point in three dimensional space. The HRTF describes how a sound from a specific point will arrive at a listener's ear. A pair of HRTFs for two ears can be used to synthesize a binaural sound that seems to come from a particular point in space. By simulating the placement of a sound source in a 3D space, spatial audio effects enable a listener to identify the location or origin of a sound in direction and distance. This is often referred to as sound localization.

Sonification is the use of non-speech audio to convey information or perceptualize data. Sonification of data generally includes altering various components of a sound as a function of the information to be conveyed in order to change the user's perception of the sound, and in turn, their perception of the underlying information being portrayed.

SUMMARY

All examples and features mentioned herein can be combined in any technically possible manner.

Certain aspects provide a method for directing a user to a point of interest using sounds played on a wearable audio output device worn by the user. The method includes determining a direction of gaze of the user using data from at least one sensor configured in the audio output device, obtaining a first location of the user, obtaining a second location of the point of interest, determining, based at least on the direction of gaze of the user, the first location and the second location, a relative angle between the direction of gaze of the user and a direction of the point of interest from the first location, determining a distance between the first location and the second location, altering an audio sample using at least one sonification technique to convey information relating to the distance and the relative angle, rendering the altered audio sample, and outputting the rendered audio sample for output by the audio output device.

According to aspects, rendering the altered audio sample comprises spatially rendering the altered audio sample, based at least on the second location of the point of interest by using at least one spatial audio technique to convey information relating to the direction of the point of interest from the first location, wherein the at least one spatial audio technique simulates in the audio output device a perceived emanation of the audio sample from the point of interest.

According to aspects, the method further comprises determining that the direction of gaze of the user matches the direction of the point of interest when the relative angle is less than a threshold angle, stopping the outputting of the rendered audio sample in response to determining that the direction of gaze of the user matches the direction of the point of interest, determining, after stopping the outputting, that the direction of gaze of the user no more matches the direction of the point of interest when the relative angle is higher than the configured threshold angle, and resuming outputting the rendered audio sample from a subsequent iteration of the method in response to the determining that the direction of gaze of the user is not more in the direction of the point of interest.

According to aspects, the audio sample comprises a repeating sound, wherein the at least one sonification technique comprises altering a rate of the repeating as a function of the determined distance between the first and the second locations. According to aspects, the at least one sonification technique comprises altering an amplitude of the audio sample as a function of the relative angle between the direction of gaze of the user and the direction of the point of interest from the first location.

According to aspects, the at least one sonification technique comprises determining an amount by which high frequency content is to be filtered out of the audio sample as a function of the determined distance between the first and the second locations, wherein the determined amount is higher for a higher value of the determined distance, and filtering out the high frequency content by the determined amount. According to aspects, the at least one sonification technique comprises determining an amount of reverberation to be added to the audio sample as a function of the determined distance between the first and the second locations, wherein the determined amount is higher for a higher value of the determined distance and adding the reverberation to the audio sample by the determined amount.

According to aspects, the method further comprises generating confirmation sound when the determined distance is below a configured threshold.

According to aspects, the direction of the point of interest includes any direction within a zone of focus defined for the point of interest, wherein the zone of focus is defined by an arc formed at the second location subtending an angle at the first location. According to aspects, the method further comprises selecting a length of the arc to include at least another point of interest and generating sonified audio for the other point of interest, for output by the audio output device.

Certain aspects provide an apparatus comprising a wearable audio output device for directing a user wearing the audio output device to a point of interest using sounds played on the audio output device. The wearable audio output device comprises at least one sensor for detecting a head orientation of the user, at least two acoustic transducers for outputting sounds, and at least one processor. The at least one processor is configured to receive a location of the audio output device, determine a direction of gaze of the user, based on data from the at least one sensor indicating the head orientation of the user, obtain a first location of the user based on the location of the audio output device, obtain a second location of the point of interest, determine, based at least on the direction of gaze of the user, the first location and the second location, a relative angle between the direction of gaze of the user and a direction of the point of interest from the first location, determine a distance between the first location and the second location, alter an audio sample using at least one sonification technique to convey information relating to the distance and the relative angle, render the altered audio sample, and output the rendered audio sample for output by the at least two acoustic transducers.

According to aspects, the at least one processor is configured to render the altered audio sample, based at least on the second location of the point of interest by using at least one spatial audio technique to convey information relating to the direction of the point of interest from the first location, wherein the at least one spatial audio technique simulates in the audio output device a perceived emanation of the audio sample from the point of interest.

According to aspects, the audio sample comprises a repeating sound, wherein the at least one sonification technique comprises altering a rate of the repeating as a function of the determined distance between the first and the second locations. According to aspects, the at least one sonification technique comprises altering an amplitude of the audio sample as a function of the relative angle between the direction of gaze of the user and the direction of the point of interest from the first location.

According to aspects, the at least one sonification technique comprises determining an amount by which high frequency content is to be filtered out of the audio sample as a function of the determined distance between the first and the second locations, wherein the determined amount is higher for a higher value of the determined distance, and filtering out the high frequency content by the determined amount. According to aspects, the at least one sonification technique comprises determining an amount of reverberation to be added to the audio sample as a function of the determined distance between the first and the second locations, wherein the determined amount is higher for a higher value of the determined distance and adding the reverberation to the audio sample by the determined amount.

Certain aspects provide for an apparatus for directing a user to a point of interest using sounds played on a wearable audio output device worn by the user. The apparatus comprises at least one processor and a memory coupled to the at least one processor. The at least one processor is configured to determine a direction of gaze of the user using data from at least one sensor configured in the audio output device, obtain a first location of the user, obtain a second location of the point of interest, determine, based at least on the direction of gaze of the user, the first location and the second location, a relative angle between the direction of gaze of the user and a direction of the point of interest from the first location, determine a distance between the first location and the second location, alter an audio sample using at least one sonification technique to convey information relating to the distance and the relative angle, render the altered audio sample, and output the rendered audio sample for output by the audio output device.

According to aspects, the at least one processor is configured to render the altered audio sample, based at least on the second location of the point of interest by using at least one spatial audio technique to convey information relating to the direction of the point of interest from the first location, wherein the at least one spatial audio technique simulates in the audio output device a perceived emanation of the audio sample from the point of interest.

According to aspects, the audio sample comprises a repeating sound, wherein the at least one sonification technique comprises altering a rate of the repeating as a function of the determined distance between the first and the second locations. According to aspects, the at least one sonification technique comprises altering an amplitude of the audio sample as a function of the relative angle between the direction of gaze of the user and the direction of the point of interest from the first location.

Two or more features described in this disclosure, including those described in this summary section, may be combined to form implementations not specifically described herein.

The details of one or more implementations are set forth in the accompanying drawings and the description below. Other features, objects and advantages will be apparent from the description and drawings, and from the claims.

DETAILED DESCRIPTION

Systems and related applications have been developed to help a person navigate to a point of interest using audio cues only. Soundscape is one such application developed by the Microsoft Corporation which uses audio based technology to enable people, particularly visually impaired people, to navigate a 3D landscape. Unlike step-by-step navigation applications (e.g., Google maps) these applications use 3D audio cues provided to a user using a wearable audio output device (such as audio headphones) for the navigation. For example, information about the user's surroundings is provided with synthesized binaural audio, creating the effect of 3D or spatial sound. A user device, such as a smart phone, generally tracks movements of the listener using location and activity sensors on the phone and generates spatialized audio that helps the user to navigate to a point of interest. Users can set virtual audio beacons at specific destinations and places, and the application provides 3D audio cues (which can be perceived directionally) to help improve their "ambient awareness" as they travel there.

Current systems rely on the smart phone to determine a direction in which the user is facing. For example, the user has to hold the phone flat in his/her hand with the top edge facing the direction they want to go, so that the inertial sensors on the phone can detect the correct direction the user is facing for use in the generation of the spatial audio. Thus, current systems do not provide a hands-free experience for audio only navigation.

Further, not everyone is perceptive to spatial audio to the same degree and users with lower perception to spatial audio may find it difficult to navigate based entirely on the spatial sounds.

Aspects of the present disclosure describe improved techniques for navigating a user to a point of interest using audio cues. The discussed techniques include sonification of a variety of information relating to navigating the user to a point of interest. In certain aspects, the sonification of information augments spatial audio that virtually places an audio source at the point of interest. Sonification techniques discussed herein allow users with lower perception of spatial audio to use the audio only navigation more effectively. Further, sonification generally allows for faster and more accurate navigation. In certain aspects, head tracking may be enabled by one or more sensors configured in a wearable audio output device, thus eliminating reliance on the phone to determine the direction the user is facing and allowing for a hands-free navigation experience.

Figure 1:
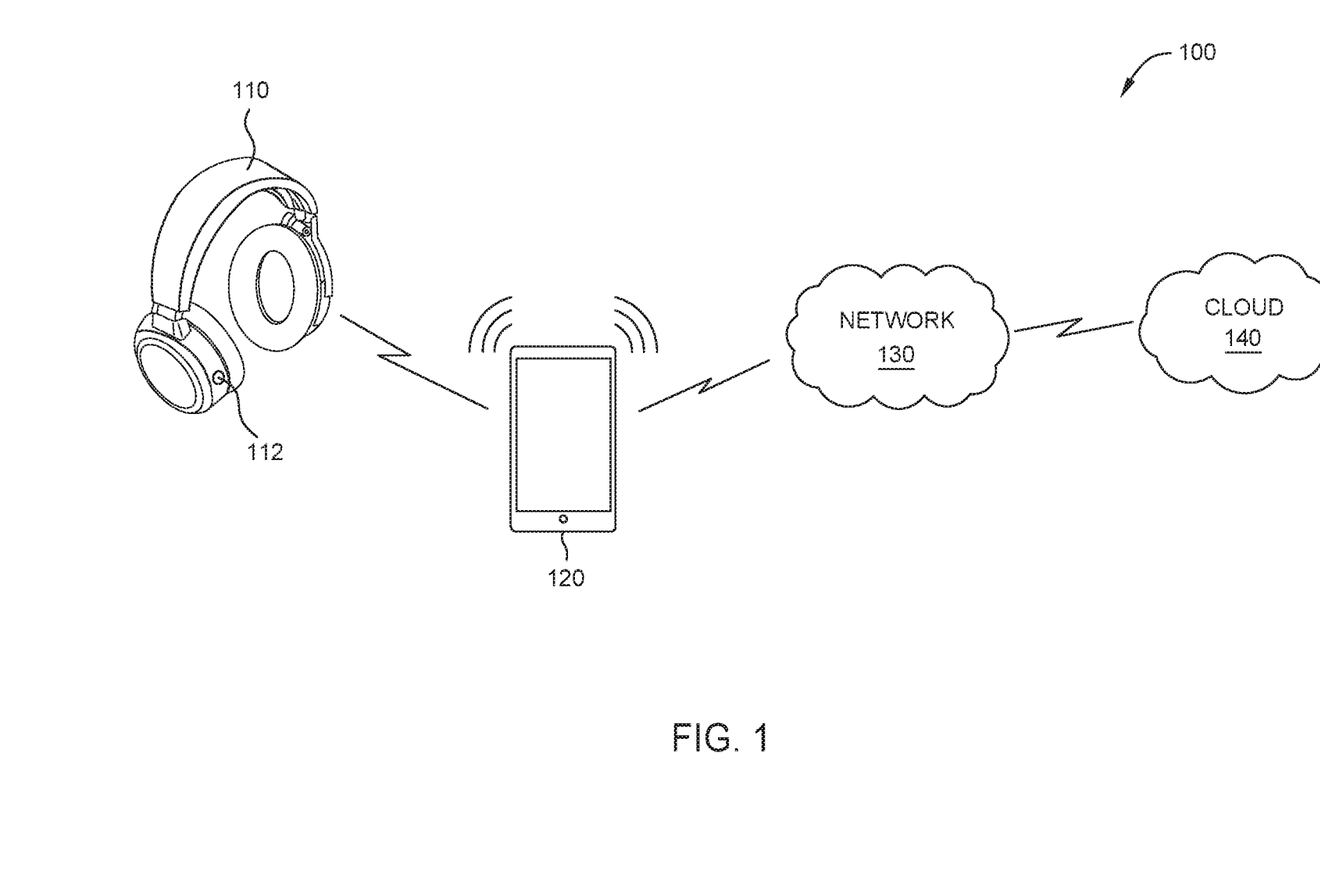
FIG. 1 illustrates an example system in which aspects of the present disclosure may be practiced.

FIG. 1 illustrates an example system 100 in which aspects of the present disclosure may be practiced.

As shown, system 100 includes a pair of headphones 110 communicatively coupled with a portable user device 120. The headphones 110 include at least one acoustic transducer (also known as driver or speaker) for outputting sound. The included acoustic transducer(s) may be configured to transmit audio through air and/or through bone (e.g., via bone conduction, such as through the bones of the skull). In an aspect, the headphones 110 include one or more microphones 112 to detect sound/noise in the vicinity of the headphones 110 to enable active noise reduction (ANR). The headphones 110 may further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the headphones 110 by using active noise cancelling. The sound masking circuitry is configured to reduce distractions by playing masking sounds via the speakers of the headphones 110. The movement detecting circuitry is configured to use devices/sensors such as an accelerometer, gyroscope, magnetometer, or the like to detect whether the user wearing the headphones is moving (e.g., walking, running, in a moving mode of transport etc.) or is at rest and/or the direction the user is looking or facing. The movement detecting circuitry may also be configured to detect a head orientation of the user for use in processing spatial audio, or augmented reality (AR) applications where an AR sound is played back based on a direction of gaze of the user. The geolocation circuitry may be configured to detect a physical location of the user wearing the headphones or a location of any other point of interest. For example, the geolocation circuitry includes Global Positioning System (GPS) antenna and related circuitry to determine GPS coordinates of the user. In aspects, the headphones 110 may not include geolocation circuitry. However, the headphones 110 include at least once processor configured to receive physical location information from an external, connected device. In this scenario, the external connected device includes geolocation circuitry to determine GPS coordinates of the user.

In an aspect, the headphones 110 include circuitry and/or firmware for processing audio (e.g., audio streamed from the user device 120 or sounds received by the microphones 112) using one or more sonification techniques for sound-based encoding of information. For example, as described in aspects of the present disclosure sonified audio may be used to convey information relating to navigating a user to a desired point of interest.

In an aspect, the headphones 110 include circuitry and/or firmware for spatially processing audio (e.g., audio streamed from the user device 120 or sounds received by the microphones 112) using HRTF to generate spatial audio that mimics sounds emanating from a point in a three dimensional space. As described in aspects of the present disclosure, spatial sounds may be used to aid in navigating a user to a point of interest.

In an aspect, the headphones 110 are wirelessly connected to the portable user device 120 using one or more wireless communication methods including but not limited to Bluetooth, Wi-Fi, Bluetooth Low Energy (BLE), other radio frequency (RF)-based techniques, or the like. In an aspect, the headphones 110 includes a transceiver that transmits and receives information via one or more antennae to exchange information with the user device 120.

In an aspect, the headphones 110 may be connected to the portable user device 120 using a wired connection, with or without a corresponding wireless connection. As shown, the user device 120 may be connected to a network 130 (e.g., the Internet) and may access one or more services over the network. As shown, these services may include one or more cloud services 140.

The portable user device 120 is representative of a variety of computing devices, such as mobile telephone (e.g., smart phone) or a computing tablet. In an aspect, the user device 120 may access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application may be accessed and run by the user device 120. For example, the cloud application may generate web pages that are rendered by the mobile web browser on the user device 120. In an aspect, a mobile software application installed on the user device 120 and a cloud application installed on a cloud server, individually or in combination, may be used to implement the techniques for keyword recognition in accordance with aspects of the present disclosure.

In an aspect, the local software application and/or the cloud application may include a navigation application that uses audio cues only for navigating a user to a point of interest, as described in aspects of the present disclosure.

It may be noted that although certain aspects of the present disclosure discuss audio navigation in the context of headphones 110 for exemplary purposes, any wearable audio output device with similar capabilities may be interchangeably used in these aspects. For instance, a wearable audio output device usable with techniques discussed herein may include over-the-ear headphones, audio eyeglasses or frames, in-ear buds, around-ear audio devices, open-ear audio devices (such as shoulder-worn or body-worn audio devices), or the like.

Figure 2:
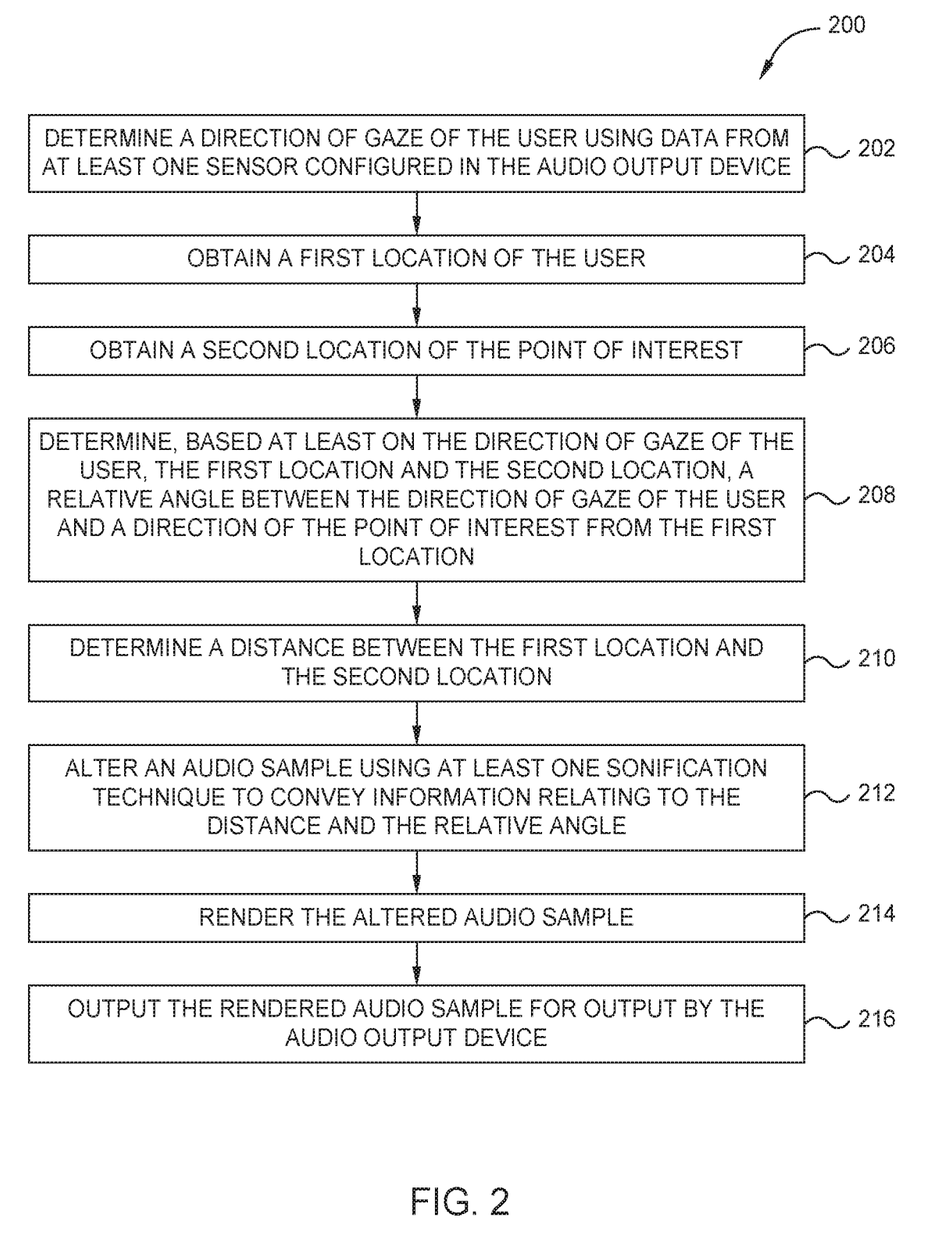
FIG. 2 illustrates example operations for directing a user to a point of interest using sounds played on a wearable audio output device worn by a user, in accordance with certain aspects of the present disclosure.

FIG. 2 illustrates example operations 200 for directing a user to a point of interest using sounds played on a wearable audio output device (e.g., headphones 110 as shown in FIG. 1) worn by a user, in accordance with certain aspects of the present disclosure. In an aspect, the point of interest may be a person, an object, or a place.

Operations 200 begin, at 202, by determining a direction of gaze of the user using data from at least one sensor configured in the audio output device. In an aspect, the at least one sensor may include an Inertial Measurement Unit (IMU) sensor including at least one of one or more accelerometers, one or more magnetometers, or one or more gyroscopes. At 204, a first location of the user is obtained.

At 206, a second location of the point of interest is obtained. At 208, it is determined, based on the direction of gaze of the user, the first location and the second location, a relative angle between the direction of gaze of the user and a direction of the point of interest from the first location. In an aspect, the relative angle includes an azimuth between the point of interest and the direction of gaze of the user. At 210, a distance is determined between the first location and the second location. At 212, an audio sample is altered using at least one sonification technique to convey information relating to the distance and the relative angle. At 214, the altered audio sample is rendered. At 216, the rendered audio sample is output for playing by the audio output device.

In an aspect, the operations 200 may be performed by the wearable audio output device worn by a user, a user device (e.g., user device 120) in communication with the wearable audio output device, or a combination thereof.

Figure 3:
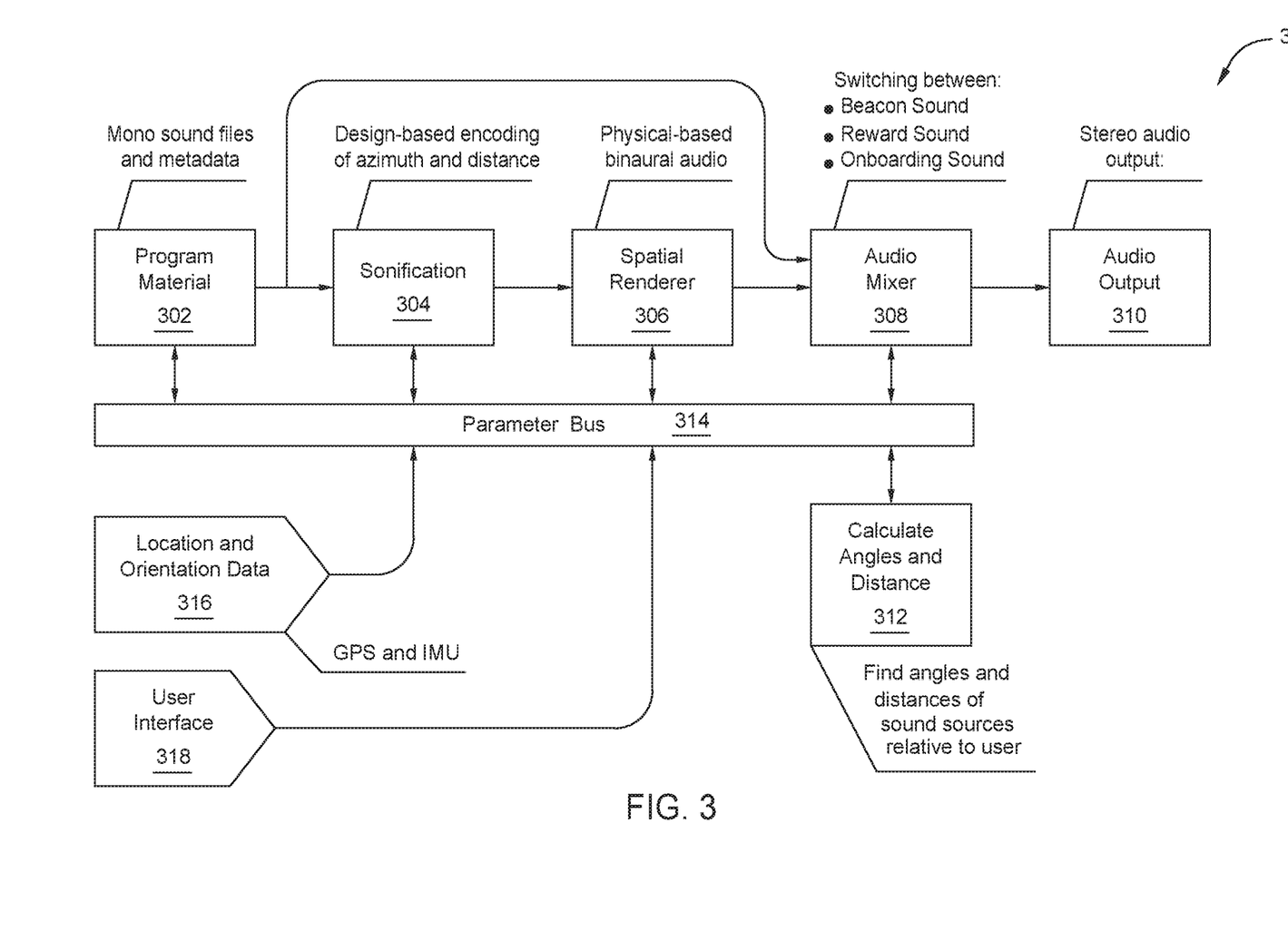
FIG. 3 illustrates a logical block diagram of an example system for directing a user to a point of interest using audio cues, in accordance with certain aspects of the present disclosure.

FIG. 3 illustrates a logical block diagram of an example system 300 for directing a user to a point of interest using audio cues, in accordance with certain aspects of the present disclosure. In an aspect, the various component modules of the system 300 may be deployed in the user device (e.g., user device 120), in a wearable audio output device (e.g., headphones 110) or a combination thereof.

As shown, system 300 includes a sonification module 304, a spatial rendering module 306, an audio mixer 308 and a calculation module 312. A parameter bus 314 connects each of the modules of the system 300 and is responsible for data communication across the system 300. As shown, the system receives as input, program material 302 including audio files and other metadata, location and orientation data 316, and inputs from a user interface 318.

In certain aspects, the audio files include sample sounds such as beacon sounds, music audio, or real-life audio streamed from the headphone microphones, radio streams, podcasts, etc.

In certain aspect, the orientation data 316 includes head tracking data from an IMU sensor in the headphones. In an aspect, the IMU sensor tracks the head movements of the user when the user is wearing the headphones. The calculation module is configured to receive the head tracking data from the IMU sensor and determine a direction of gaze of the user, that is, a direction in which the user is looking.

In certain aspects, the location data 316 includes location information from a location service such as Google maps, Apple maps, or the like. In an aspect, the location information includes a location of the user and a location of one or more points of interest. For example, the location includes GPS coordinates of the user and the one or more points of interest. The calculation module is configured to determine a distance between the user and a point of interest, based on the locations of the user and the point of interest. Additionally or alternatively, the calculation module is configured to determine a direction of the point of interest relative to the user's location. The calculation module is further configured to determine a relative angle (e.g., azimuth) between the direction of gaze of the user and the direction of the point of interest relative to the user's location.

In certain aspects, the user interface 318 may include an interface that allows the user to interact with the system 300. In an aspect, the user interface 318 allows the user to provide inputs to the system using one or more supported input methods including voice prompts, gestures, touch, etc. For example, the user may select a point of interest for navigation by facing in the direction of the point of interest and by tapping on the headphones, by pressing a button on the headphones, or by a voice command. In an aspect, the user may select a point of interest by searching for the point of interest on a mapping application (e.g., Google maps, Apple maps, etc.) on a smart phone and may select the point of interest on the smart phone.

The sonification module 304 may be configured to encode information generated by the calculation module on an audio sample (e.g., an audio sample from the program material 302), based on several sonification techniques as will be discussed in the following paragraphs. For example, the sonification module 304 is configured to encode information related to the azimuth between the direction of gaze of the user and the direction of a point of interest (e.g., selected by the user), and a determined distance between the user and the point of interest. In an aspect, the sonification of information related to the azimuth and distance provides clear audio cues to the user which aids in navigating the user to the point of interest.

The spatial rendering module 306 is configured to process the audio sample based on the determined azimuth between the direction of gaze of the user and the direction of a point of interest, and generates spatial audio to be delivered to the user via the stereo speakers of the user's headphones which places a virtual sound source in the user's three dimensional space in order to mimic sounds emanating from the point of interest. In an aspect, the spatial rendering of the audio sample is optional and is designed to augment the sonified audio generated by the sonification module 304 and provides the user an additional audio cue regarding the direction of the point of interest.

The audio mixer 308 is configured to mix several sounds generated by the sonification module and the spatial module before the mixed audio is output by the audio output module 310. For example, a sample beacon sound may be encoded with information using one or more sonification techniques and spatialized for conveying information regarding the azimuth and distance when the user starts navigating to a point of interest, and then a reward sound (e.g., different sample sound) may be mixed in with the beacon sound when the user is facing in the direction of the point of interest and/or when the user is within certain distance from the point of interest.

Figure 4:
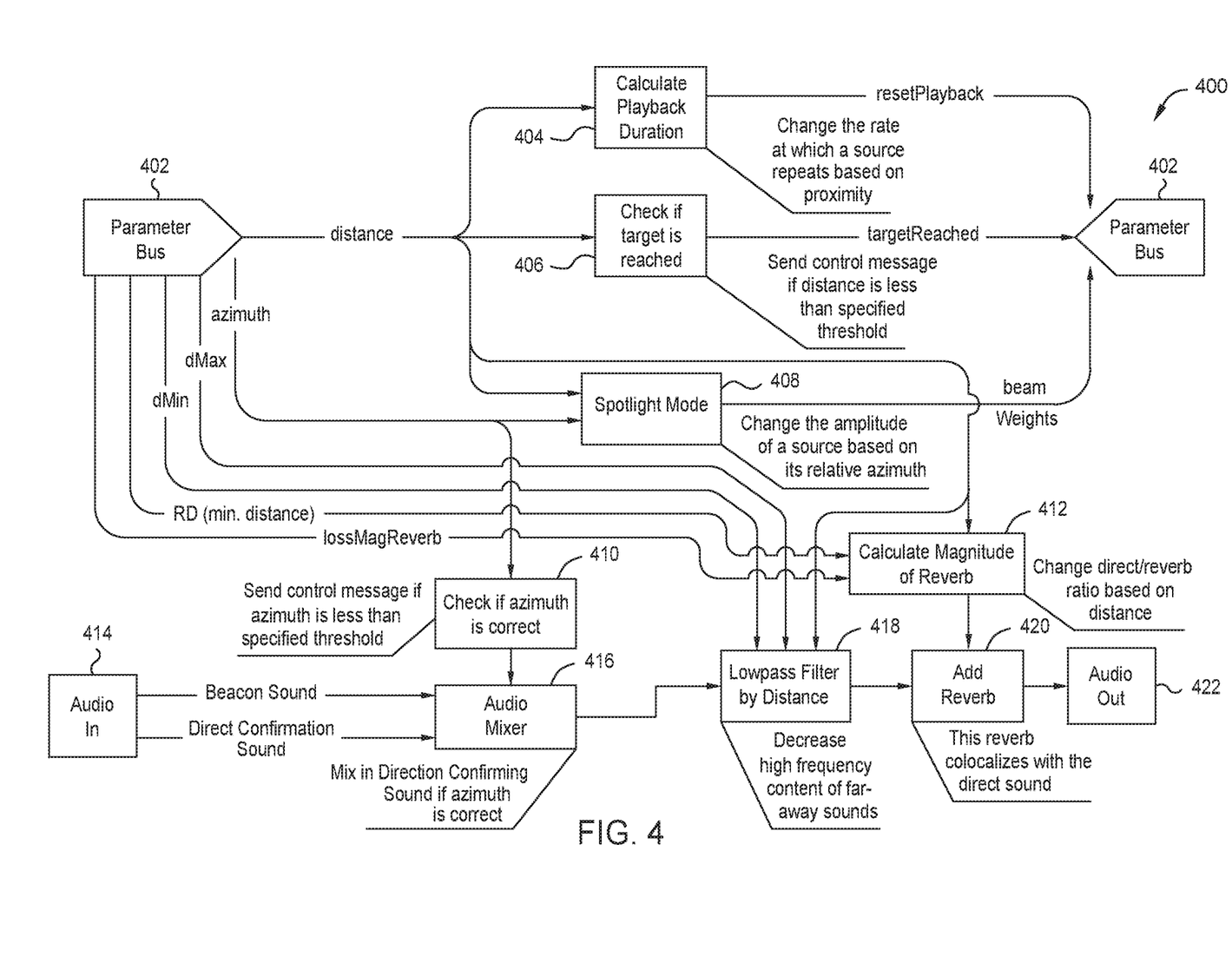
FIG. 4 illustrates a logical block diagram of an example system for sonifying information to aid in directing a user to a point of interest using audio cues, in accordance with certain aspects of the present disclosure.

FIG. 4 illustrates a logical block diagram of an example system 400 for sonifying information to aid in directing a user to a point of interest using audio cues, in accordance with certain aspects of the present disclosure. In an aspect, the various component modules of the system 400 may be deployed in the user device (e.g., user device 120), in a wearable audio output device (e.g., headphones 110) or a combination thereof. In an aspect, at least some component modules of the system 400 may be implemented in the sonification module 304 of system 300 as shown in FIG. 3. In an aspect, each of the component modules of the system 400 uses at least one sonification technique to encode information relating to a relative azimuth or distance associated with a point of interest.

As shown, parameter bus 402 connects each of the modules of the system 400 and is responsible for data communication across the system 400. In an aspect, system 400 receives information (e.g., from the calculation module 312) relating to a determined relative azimuth between the direction of gaze of the user and the direction of the point of interest relative to the user, and information relating to a determined distance between the user's location and the point of interest.

The example system 400 uses a sample beacon sound for conveying information regarding the relative azimuth and the distance information to the user. As shown, an audio input 414 provides a sample beacon sound as an input to system 400. The beacon sound is processed by one or more modules of the system 400 and output by an audio out 422, for example, for playing on the stereo speaker of the headphone. It may be noted that the system 400 may use any other sample sound to encode the information regarding the relative azimuth and the distance. For the sample sound may include music audio, real-life sounds streamed from the headphone microphones, radio stream, podcasts etc.

For example, when the user is in an active navigation mode and has selected a point of interest for navigation, the calculation module 312 (as shown in FIG. 3) continuously (e.g., periodically or at configured intervals) determines the relative azimuth for the selected point of interest and the distance between the user's location and the point of interest as described with reference to FIG. 3. In an aspect, the beacon sound is output by the audio out module 422 (e.g., after processing by one or more modules of system 400) at configured intervals until the user is determined as having successfully reached the selected point of interest.

The spotlight module 408 is configured to change the amplitude of the sample beacon sound based on the determined relative azimuth. For example, the spotlight module 408 may increase the amplitude (e.g., loudness) of the beacon sound as the relative angle between the direction of gaze of the user and the direction of the point of interest decreases. In an aspect, the amplitude may be set to a lowest setting when the user is facing directly opposite of the direction of the point of interest, and may be set to a highest level when the user is facing in the direction of the point of interest. The loudness of the sample beacon sound is indicative of how close the direction of gaze of the user is to the direction of the point of interest. For example, the user may be facing away from the point of interest when the user triggers the navigation. Thus, the beacon sound may start at a lower amplitude setting. As the user moves his/her head, the relative azimuth changes resulting in the amplitude of the beacon being changed. Based on the changing loudness of the beacon sound, the user may turn his/her head in a direction that results in the beacon sound becoming louder and may continue turning his/her head until the beacon sound is at its highest loudness which indicates that the user is facing in the direction of the point of interest.

Module 404 is configured to calculate a repetition rate of the sample beacon as a function of the distance between the user and the point of interest. For example, module 404 may increase the repetition rate of the beacon as the user moves closer to the point of interest and decrease the repetition rate of the beacon as the user moves away from the point of interest. Thus, the change in the repetition rate of the beacon provides the user with a sense of how far the user is from the point of interest and whether the user is moving closer or away from the point of interest.

In certain aspects, it is known that sounds emanating from sound sources farther away have fewer higher frequency components as compared to sounds emanating from nearby sound sources. In certain aspects, the low pass filter module 418 is configured to mimic this quality of real-world sounds by filtering out high frequency components of the sample beacon as a function of the distance between the user and the point of interest. For example, the low pass filter module 418 filters out the higher frequency components of the beacon when the user is far away from the point of interest and passes through an increasing amount of high frequency components as the user moves closer to the point of interest. This sonification technique helps provide the user with a perception of the distance from the point of interest.

Another known quality of real-world sound sources is that a faraway sound source tends to have a higher reverberation as compared to a nearby sound source. In certain aspects, modules 412 and 420 are configured to mimic this quality of real-world sounds by adding reverberation to the beacon as a function of the distance between the user and the point of interest. For example, module 412 is configured to calculate a magnitude of reverberation to be added to the beacon as a function of the user's distance from the point of interest and module 420 is configured to add reverberation to the beacon based on the calculated magnitude. In an aspect, more reverberation is added when the user is far away from the point of interest and the magnitude of the reverberation is decreased as the user moves closer to the point of interest. This sonification technique also helps provide the user with a perception of the distance from the point of interest.

In an aspect, controlling the high frequency components and reverberation of the beacon together helps mimic a real-world sound source and provides a user with a more accurate perception of the distance from the point of interest.

In certain aspects, module 410 is configured to monitor the relative azimuth between the user's direction of gaze and the direction of the point of interest, and generate a control message when the azimuth is less than a specified threshold azimuth. The audio mixer 416 is configured to mix in a direction confirmation sound (from the audio input 414) with the beacon sound, in response to receiving the control message from the module 410. The direction confirmation sound helps the user know that the user is facing in the correct direction of the point of interest.

In certain aspects, module 406 is configured to monitor the distance between the user and the point of interest and generate a control message when the distance is less than a threshold distance. In an aspect, the control message may be sonified (not shown) and a destination confirmation sound may be played when in response to the control message indicating that the user has reached the point of interest.

It may be noted that all sonification techniques described with reference to system 400 need not be enabled, and that system 400 may enable a subset of the sonification techniques at any time.

In an example use case, a user may be wearing audio headphones (e.g., headphones 110 as shown in FIG. 1) which are connected to the user's smartphone (e.g., via Bluetooth). The user may launch an audio navigation mode in a number of ways. For example, the user may initiate the navigation mode by using a navigation application on the user's smart phone, by pressing a designated button on the headphones, by issuing a voice command or the like. The user may then proceed to select a point of interest the user wishes to navigate to. For example, the user may view several points of interests (e.g., restaurants, bars, train station, convenience store etc.) on a map on the user's smart phone, and the user may select one of the shown points of interests for navigation. In an aspect, virtual sound sources corresponding to multiple points of interests in the vicinity of the user may be placed in the user's three dimensional space in order to mimic sounds emanating from the multiple points of interests. The user may select a point of interest by turning the user's head to face a particular point of interest (based on the virtual sound source corresponding to the point of interest) and by pressing a button on the headphones or by tapping the headphones.

Once the user has selected the point of interest, a location service on the user's smartphone continuously (e.g., at regular intervals) determines a location of the user, the location of the selected point of interest, and a distance between the user and the point of interest. The IMU in the headphones continuously (e.g., at regular intervals) tracks the user's head movements and streams the IMU data to the smartphone. The smartphone, based on the received IMU data, continuously (e.g., at regular intervals) determines a relative azimuth between the direction of gaze of the user and the direction of the point of interest relative to the user.

The smartphone processes a sample sound (e.g., beacon sound) continuously (e.g., at regular intervals) based on one or more sonification techniques and streams the processed sound to the headphones for playing via the headphone speakers to convey information relating to the determined azimuth and distance. For example, a beacon sound is repeated at regular intervals and one or more characteristics of the beacon sound are continuously adjusted based on the determined azimuth and distance. In an aspect, determining the relative azimuth and distance continuously and adjusting the beacon sound accordingly ensures that the user is provided with the most recent information.

For example, when the user initiates navigation to the selected point of interest, the user may be facing away from the point of interest. The system starts playing the beacon sound at a lower amplitude and lower repetition rate. As the user turns his/her head towards the point of interest the amplitude of the beacon is increased and until the user is facing in the direction of the point of interest when the beacon is played at its loudest setting. In an aspect, a direction confirmation sound is played when the user turns his/her head to face in the direction of the point of interest. Additionally, as the user starts moving towards the point of interest, the repetition rate of the beacon is increased to indicate to the user that the user is moving closer to the point of interest. Optionally, high frequency components and reverberation of the beacon sound may be controlled based on the user's distance from the point of interest to provide the user with a real-world perception of distance. In an aspect, when the user is within a specified distance from the point of interest, a destination confirmation sound is played to indicate that the user has successfully reached the point of interest.

In an aspect, the beacon sound is played only until the user is trying to find the correct direction of the point of interest. When the user successfully finds the correct direction of the point of interest by facing in the correct direction, a direction confirmation sound is played and the beacon sound stops playing. In an aspect, the beacon sound resumes playing only when the user is determined to have veered off course and is not facing in the correct direction of the point of interest. By playing the beacon sounds only when the user is off course, the audio navigation is less intrusive to the user. In an aspect, a destination confirmation sound may be played when the user is determined to have reached the point of interest.

In certain aspect, the determination of whether the user is facing in the correct direction of a selected point of interest (e.g., by module 410 in FIG. 4) may be determined by a zone of focus set for the point of interest.

Figure 5:
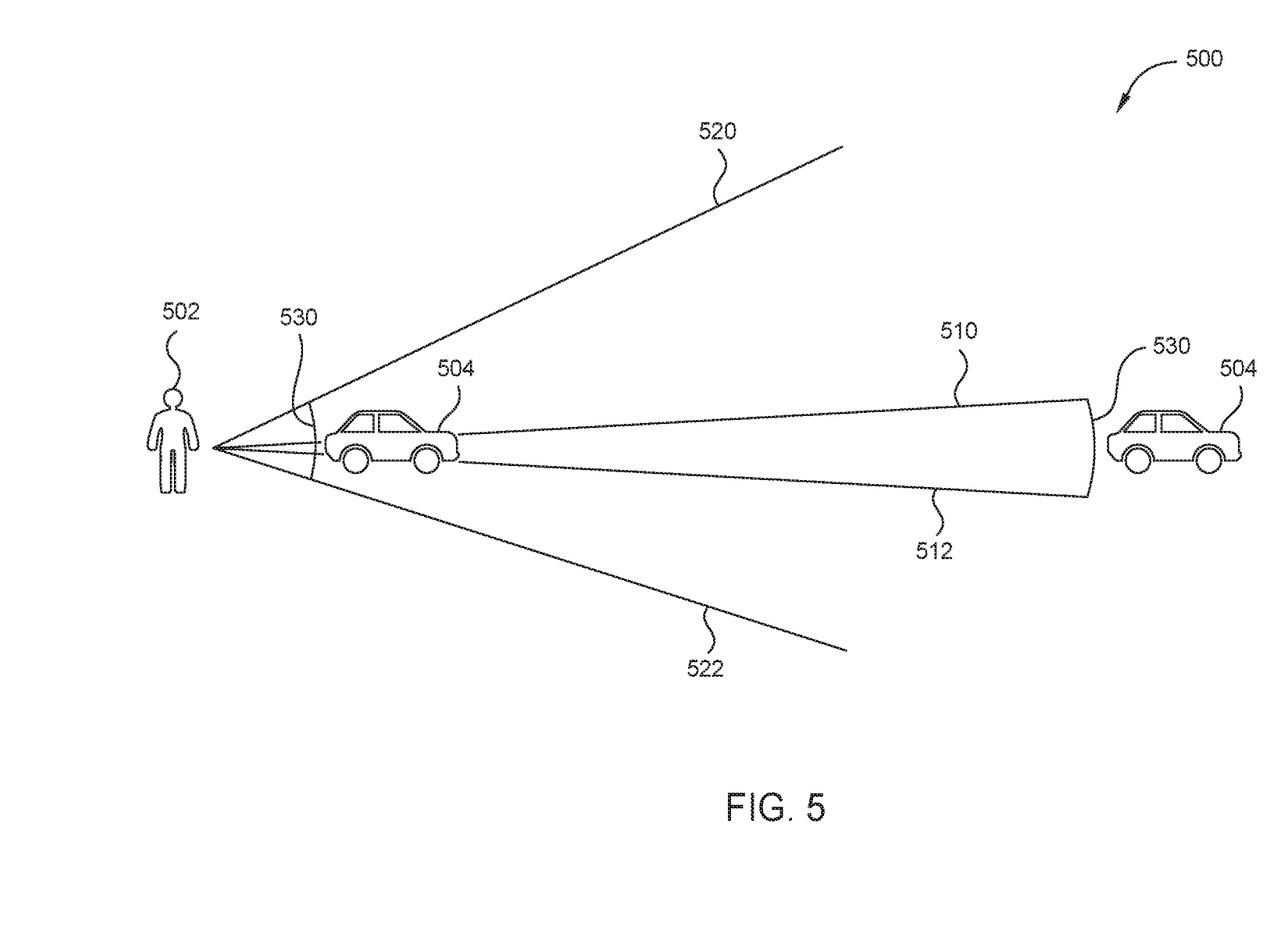
FIG. 5 illustrates setting a zone of focus for a selected point of interest, in accordance with certain aspects of the present disclosure.

FIG. 5 illustrates setting a zone of focus for a selected point of interest, in accordance with certain aspects of the disclosure.

As shown in FIG. 5, a zone of focus of a user 502 for a point of interest 504 (a car in this case) is defined by two vectors. For example, when the car is farther away from the user, the zone of focus is defined by the vectors 510 and 512. In an aspect, the user's direction of gaze is determined as matching the direction of the car when the user's direction of gaze is anywhere in the zone of focus between vectors 510 and 512. Thus, in an aspect, a direction confirmation sound may be triggered by module 410 (as shown in FIG. 4) when the user's direction of gaze is between the vectors 510 and 512.

In an aspect, as shown in FIG. 5, when the car is closer to the user, the car appears larger, and thus, the zone of focus can be broader as defined by the vectors 520 and 522, and the confirmation sound may be triggered when the direction of gaze of the user is in the broader zone of focus defined by the vectors 520 and 522.

In certain aspects, the zone of focus may be adjusted as a function of the distance between the user and the point of interest 504. In an aspect, the user may start with a narrower zone of focus when the point of interest is farther away from the user. The zone of focus may be broadened as the user approaches the point of interest.

In certain aspect, the zone of focus may be defined by an arc (e.g., arc of a circle, ellipse etc.) having a constant length. In an aspect, the arc may be defined at the point of interest 504 subtending an angle at the user's location, where the constant length of the arc substantially covers a length (or width, depth, height etc.) of the point of interest as seen from the user's position. For example, as shown in FIG. 5, the arc 530 defines the zone of focus for the car. As may be seen in FIG. 5, the length of the arc remains constant regardless of the distance between the user and the car. However, the same length of the arc translates into a narrow zone of focus when the car is farther away from the user, and translates into a broader zone of focus when the car is closer to the user.

In certain aspects, when the user enters a navigation mode, the system may be initialized with a broad zone of focus so as to encompass multiple points of interest. The user may hear spatially processed sounds (e.g., beacon sounds) from sound sources virtually placed at each point of interest encompassed by the broad zone of focus. The user may select one of the points of interest (e.g., by facing the point of interest based on the corresponding beacon and pressing a button on the headphones), resulting the zone of focus to be set to encompass the selected point of interest only. As the user starts navigating to the selected point of interest, the zone of focus for the selected point of interest may then be adjusted as a function of the distance between the user and the point of interest.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware embodiment, an entirely software embodiment (including firmware, resident software, micro-code, etc.) or an embodiment combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method for directing a user to a point of interest using sounds played on a wearable audio output device worn by the user, comprising:
   determining a direction of gaze of the user using data from at least one sensor configured in the audio output device;
   obtaining a first location of the user;
   obtaining a second location of the point of interest;
   determining, based at least on the direction of gaze of the user, the first location and the second location, a relative angle between the direction of gaze of the user and a direction of the point of interest from the first location, wherein the direction of the point of interest includes any direction within a zone of focus defined for the point of interest, wherein the zone of focus is defined by an arc formed at the second location subtending an angle at the first location;
   determining a distance between the first location and the second location;
   altering an audio sample using at least one sonification technique to convey information relating to the distance and the relative angle;
   rendering the altered audio sample; and
   outputting the rendered audio sample for output by the audio output device.

2. The method of claim 1, wherein the rendering comprises spatially rendering the altered audio sample, based at least on the second location of the point of interest by using at least one spatial audio technique to convey information relating to the direction of the point of interest from the first location, wherein the at least one spatial audio technique simulates in the audio output device a perceived emanation of the audio sample from the point of interest.

3. The method of claim 1, further comprising:
   determining that the direction of gaze of the user matches the direction of the point of interest when the relative angle is less than a threshold angle;
   stopping the outputting of the rendered audio sample in response to determining that the direction of gaze of the user matches the direction of the point of interest;
   determining, after stopping the outputting, that the direction of gaze of the user no more matches the direction of the point of interest when the relative angle is higher than the threshold angle; and
   resuming outputting the rendered audio sample from a subsequent iteration of the method in response to the determining that the direction of gaze of the user is not more in the direction of the point of interest.

4. The method of claim 1, wherein the audio sample comprises a repeating sound, wherein the at least one sonification technique comprises altering a rate of the repeating as a function of the determined distance between the first and the second locations.

5. The method of claim 1, wherein the at least one sonification technique comprises altering an amplitude of the audio sample as a function of the relative angle between the direction of gaze of the user and the direction of the point of interest from the first location.

6. The method of claim 1, wherein the at least one sonification technique comprises:
   determining an amount by which high frequency content is to be filtered out of the audio sample as a function of the determined distance between the first and the second locations, wherein the determined amount is higher for a higher value of the determined distance; and
   filtering out the high frequency content by the determined amount.

7. The method of claim 1, wherein the at least one sonification technique comprises:
   determining an amount of reverberation to be added to the audio sample as a function of the determined distance between the first and the second locations, wherein the determined amount is higher for a higher value of the determined distance; and
   adding the reverberation to the audio sample by the determined amount.

8. The method of claim 1, further comprising:
   generating confirmation sound when the determined distance is below a configured threshold.

9. The method of claim 1, further comprising:
   selecting a length of the arc to include at least another point of interest; and
   generating sonified audio for the other point of interest, for output by the audio output device.

10. The method of claim 1, wherein the relative angle includes an azimuth parameter.

11. A wearable audio output device for directing a user wearing the audio output device to a point of interest using sounds played on the audio output device, comprising:
   at least one sensor for detecting a head orientation of the user;
   at least two acoustic transducers for outputting sounds; and
   at least one processor configured to:
      receive a location of the audio output device;
      determine a direction of gaze of the user, based on data from the at least one sensor indicating the head orientation of the user;
      obtain a first location of the user based on the location of the audio output device;

obtain a second location of the point of interest;
determine, based at least on the direction of gaze of the user, the first location and the second location, a relative angle between the direction of gaze of the user and a direction of the point of interest from the first location, wherein the direction of the point of interest includes any direction within a zone of focus defined for the point of interest, wherein the zone of focus is defined by an arc formed at the second location subtending an angle at the first location;
determine a distance between the first location and the second location;
alter an audio sample using at least one sonification technique to convey information relating to the distance and the relative angle;
render the altered audio sample; and
output the rendered audio sample for output by the at least two acoustic transducers.

12. The wearable audio output device of claim 11, wherein the at least one processor configured to render the altered audio sample, based at least on the second location of the point of interest by using at least one spatial audio technique to convey information relating to the direction of the point of interest from the first location, wherein the at least one spatial audio technique simulates in the audio output device a perceived emanation of the audio sample from the point of interest.

13. The wearable audio output device of claim 11, wherein the audio sample comprises a repeating sound, wherein the at least one sonification technique comprises altering a rate of the repeating as a function of the determined distance between the first and the second locations.

14. The wearable audio output device of claim 11, wherein the at least one sonification technique comprises altering an amplitude of the audio sample as a function of the relative angle between the direction of gaze of the user and the direction of the point of interest from the first location.

15. The wearable audio output device of claim 11, wherein the at least one sonification technique comprises:
determining an amount by which high frequency content is to be filtered out of the audio sample as a function of the determined distance between the first and the second locations, wherein the determined amount is higher for a higher value of the determined distance; and
filtering out the high frequency content by the determined amount.

16. The wearable audio output device of claim 11, wherein the at least one sonification technique comprises:
determining an amount of reverberation to be added to the audio sample as a function of the determined distance between the first and the second locations, wherein the determined amount is higher for a higher value of the determined distance; and
adding the reverberation to the audio sample by the determined amount.

17. An apparatus for directing a user to a point of interest using sounds played on a wearable audio output device worn by the user, comprising:
at least one processor configured to:
determine a direction of gaze of the user using data from at least one sensor configured in the audio output device;
obtain a first location of the user;
obtain a second location of the point of interest;
determine, based at least on the direction of gaze of the user, the first location and the second location, a relative angle between the direction of gaze of the user and a direction of the point of interest from the first location, wherein the direction of the point of interest includes any direction within a zone of focus defined for the point of interest, wherein the zone of focus is defined by an arc formed at the second location subtending an angle at the first location;
determine a distance between the first location and the second location;
alter an audio sample using at least one sonification technique to convey information relating to the distance and the relative angle;
render the altered audio sample; and
output the rendered audio sample for output by the audio output device; and
a memory coupled to the at least one processor.

18. The apparatus of claim 17, wherein the at least one processor is configured to render the altered audio sample, based at least on the second location of the point of interest by using at least one spatial audio technique to convey information relating to the direction of the point of interest from the first location, wherein the at least one spatial audio technique simulates in the audio output device a perceived emanation of the audio sample from the point of interest.

19. The apparatus of claim 17, wherein the audio sample comprises a repeating sound, wherein the at least one sonification technique comprises altering a rate of the repeating as a function of the determined distance between the first and the second locations.

20. The apparatus of claim 17, wherein the at least one sonification technique comprises altering an amplitude of the audio sample as a function of the relative angle between the direction of gaze of the user and the direction of the point of interest from the first location.

* * * * *